United States Patent
Rai et al.

(10) Patent No.: US 8,558,421 B2
(45) Date of Patent: Oct. 15, 2013

(54) SHAFT MOUNTED GEARED FAN FOR OPERATING MOTORS AND METHOD OF ASSEMBLING SUCH MOTORS

(75) Inventors: Mandar Ranganath Rai, Hyderabad (IN); Sreeramachandra Ragidimilli, Hyderabad (IN); Sachin Vitthal Mahajan, Hyderabad (IN)

(73) Assignee: General Electric Compant, Schenectady, NY (US)

( * ) Notice: Subject to any disclaimer, the term of this patent is extended or adjusted under 35 U.S.C. 154(b) by 260 days.

(21) Appl. No.: 13/191,795

(22) Filed: Jul. 27, 2011

(65) Prior Publication Data
US 2013/0028751 A1 Jan. 31, 2013

(51) Int. Cl.
*H02K 9/00* (2006.01)

(52) U.S. Cl.
USPC ............................................. 310/52; 310/53

(58) Field of Classification Search
USPC ............................... 310/62, 52, 53, 54, 58, 64
See application file for complete search history.

(56) References Cited

U.S. PATENT DOCUMENTS

| | | | |
|---|---|---|---|
| 3,748,507 A | 7/1973 | Sieber | |
| 4,763,031 A | 8/1988 | Wang | |
| 4,959,570 A | 9/1990 | Nakamura et al. | |
| 5,130,585 A | 7/1992 | Iwamatsu et al. | |
| 5,332,369 A | 7/1994 | Jensen | |
| 5,859,482 A | 1/1999 | Crowell et al. | |
| 6,727,609 B2 | 4/2004 | Johnsen | |
| 6,897,581 B2 | 5/2005 | Doherty et al. | |
| 6,909,210 B1 | 6/2005 | Bostwick | |
| 7,008,348 B2 | 3/2006 | LaBath | |
| 7,009,317 B2 | 3/2006 | Cronin et al. | |
| 7,615,898 B2 * | 11/2009 | Chang | 310/68 R |
| 2007/0108852 A1 | 5/2007 | Bolsoy | |
| 2007/0228848 A1 * | 10/2007 | Wiker et al. | 310/64 |
| 2012/0181967 A1 * | 7/2012 | Fulton et al. | 318/480 |

\* cited by examiner

*Primary Examiner* — Nguyen N Hanh
(74) *Attorney, Agent, or Firm* — Armstrong Teasdale LLP

(57) ABSTRACT

A geared cooling device and method of manufacturing a geared cooling device. The cooling device includes a fan shaft, a fan coupled to the fan shaft and a speed adjuster coupled to a motor shaft of a motor and coupled to the fan shaft. The speed adjuster adjusts a rotational speed of the fan shaft to cause the fan shaft to rotate at a different rotational speed than the motor shaft to facilitate passing cooling air past the motor. The method of manufacturing includes coupling the speed adjuster to the motor shaft and to the fan shaft.

20 Claims, 6 Drawing Sheets

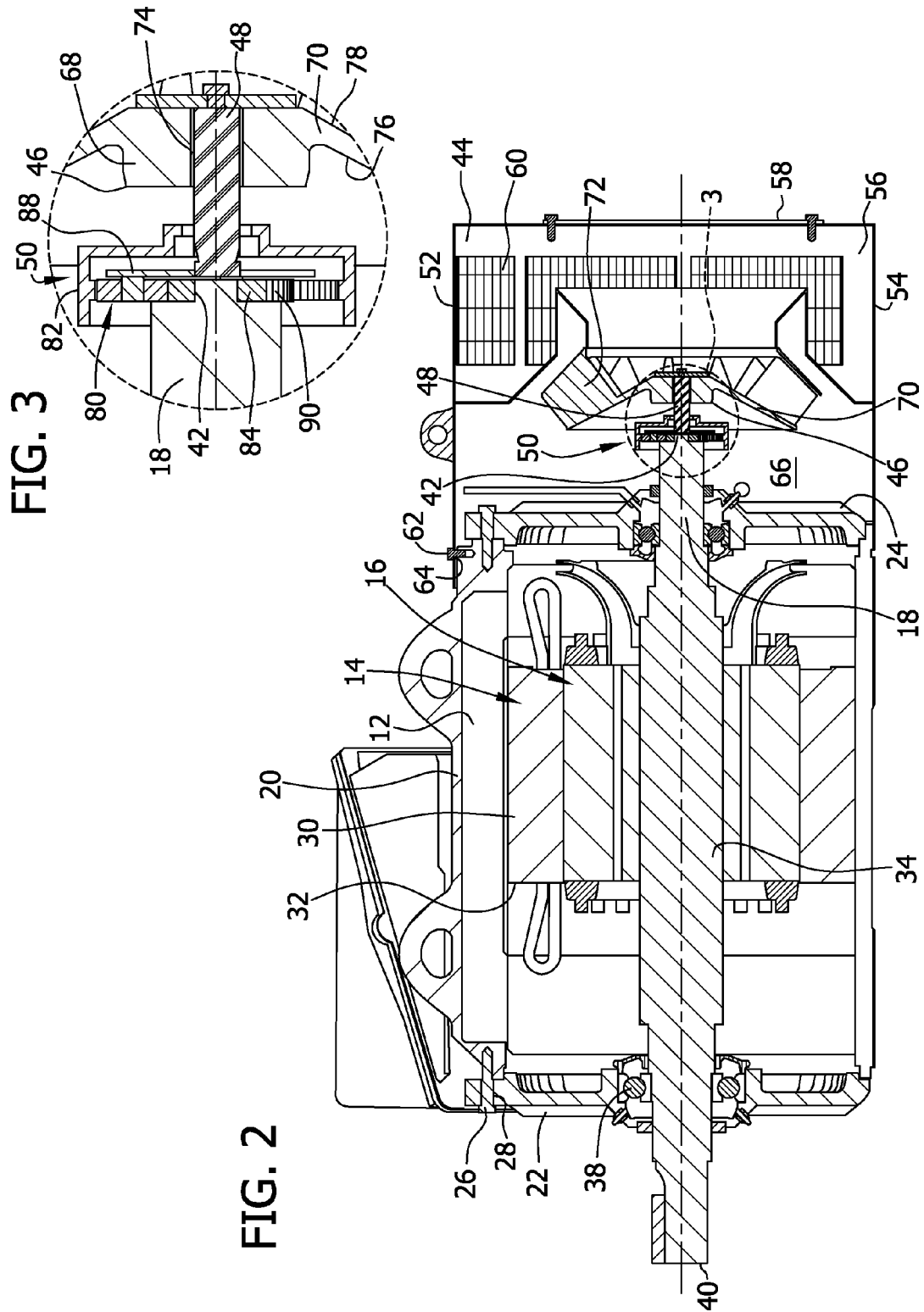

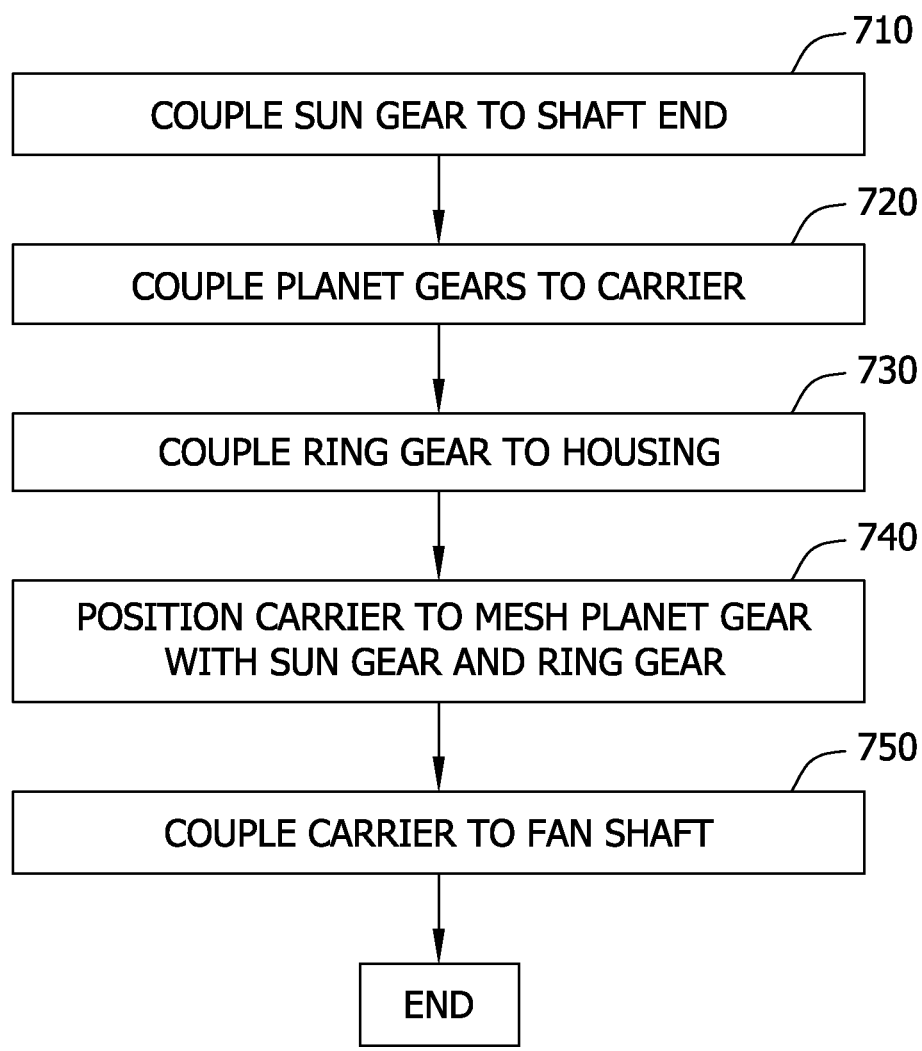

SHAFT MOUNTED GEARED FAN FOR OPERATING MOTORS AND METHOD OF ASSEMBLING SUCH MOTORS

BACKGROUND

The present disclosure relates generally to electric motors and more particularly to methods and systems for use in cooling an electric motor.

Electric motors generate heat during operation as a result of both electrical and mechanical losses. Typically, an electric motor must be cooled to facilitate the desired and efficient operation of the motor. Moreover, an excessively high motor temperature may result in motor bearing failure or damage to the stator winding insulation.

Electric motors generally have an enclosure including a frame and endshields. The most common enclosures are either "open" or totally enclosed. With an "open" enclosure, ambient air circulates within the enclosure, and heat is removed by convection between the air and heat generating motor components within the enclosure. The heated air is exhausted out from the enclosure. In contrast, totally enclosed type enclosures typically are used in applications in which airborne contaminants, e.g., dirt, oil, or mist, must be prevented from entering within the enclosure. Both convection and conduction type cooling occurs within the enclosure, and some convection cooling occurs along the external surfaces of the enclosure. For example, forced convection cooling is provided by a fan directly mounted to the motor shaft external to the enclosure that forces air over the frame and endshields. In particular, the fan is directly mounted on the shaft using a keyway or a bolt mechanism. During motor operation, the fan rotates at the same speed as that of the motor.

Manufactures have developed various types of fans and fan covers for cooling different types of motors. The various types and forms of fans depend on motor considerations such as the pole of the motor, direction of rotation, space consideration to maintain the footprint of the motor, regulatory requirement and noise levels. The cooling performance is based on the motor characteristics in which the fan operates. Accordingly, manufacturers are required to develop, install and maintain multiple variations of fans and fan covers for different motors. Operating with the wrong fan and/or fan cover may decrease performance of the motor and/or cost inefficiencies for motor cooling.

BRIEF DESCRIPTION

In one aspect, a cooling device is provided. The cooling device includes a fan shaft and a fan coupled to the fan shaft. The cooling device further includes a speed adjuster coupled to the motor shaft and coupled to the fan shaft to facilitate adjusting a rotational speed of the fan shaft to rotate the fan shaft at another rotational speed than the motor shaft to facilitate moving air around the electrical motor.

In another aspect, an electrical motor is provided. The electrical motor includes a stator, a rotor and a motor shaft mounted within the rotor for rotation in the stator. The electrical motor further includes a fan shaft and a speed adjuster coupled to the motor shaft and coupled to the fan shaft to facilitate adjusting a rotational speed of the fan shaft to rotate the fan shaft at another rotational speed than the motor shaft to facilitate moving air around the electrical motor.

In a further aspect, a method of manufacturing a cooling device for an electrical motor is provided. The method includes coupling a fan to a fan shaft and coupling a speed adjuster to the fan shaft. The method further includes coupling the speed adjuster to a motor shaft to facilitate adjusting a rotational speed of the fan shaft to rotate the fan shaft at another rotational speed than the motor shaft to facilitate moving air around the electrical motor.

BRIEF DESCRIPTION OF THE DRAWINGS

FIG. 2 illustrates a side cross sectional view of the cooling device shown in FIG. 1.

FIG. 3 is a partial detail view of an exemplary speed adjuster used with the cooling device shown in FIG. 2.

FIG. 7 illustrates a flowchart of an exemplary method that may be used in manufacturing the cooling device shown in FIG. 1.

DETAILED DESCRIPTION

Figure 1:
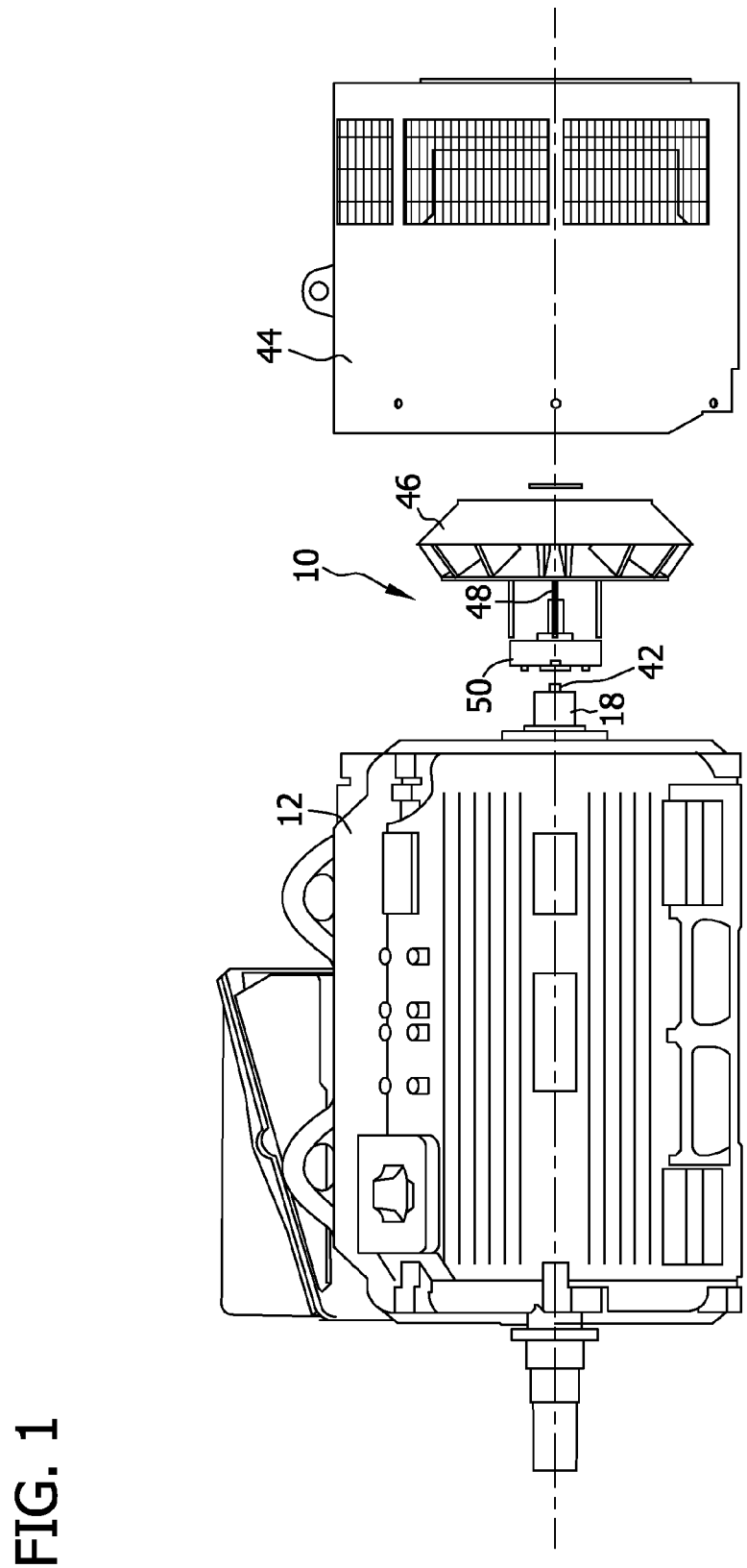
FIG. 1 illustrates a side, exploded view of an exemplary cooling device used for cooling a motor.

FIG. 1 is a side exploded view of an exemplary cooling device 10 used with an electrical motor 12. FIG. 2 is a side cross sectional view of cooling device 10 coupled to electric motor 12. FIG. 3 is a partial detail view of components of cooling device 10. In the exemplary embodiment, cooling device 10 facilitates cooling and heat dissipation for the electric motor 12. Cooling device 10 also facilitates cooling and heat dissipation for non-electric motors (not shown). Electric motor 12 includes a stationary assembly or stator (generally designated 14), a rotatable assembly or rotor (generally designated 16) magnetically coupled to stator 14 and a motor shaft 18. An enclosure 20 of motor 12 houses stator 14 and rotor 16. A front endshield 22 and a back endshield 24 define opposite longitudinal ends of enclosure 20. Endshields 22 and 24 are coupled together via circumferentially-spaced fasteners 26 which are received through corresponding bores 28 defined on each endshields 22 and 24.

Stator 14 retains one or more wire-wound coils or windings (generally designated 30). In particular, stator 14 may be formed from a series of thin laminates placed side-by-side, along with windings 30 formed of conducting material. Stator 14 may include also end windings 32, formed from a series of wound conductive materials. Rotor 16 is housed within stator 14 and rotates within stator 14 to create torque and/or power. Formed in a cylindrical shape, rotor 16 has an open center 34 that enables coupling to shaft 18. Electric motor 12 transforms electrical energy into mechanical torque, or vice versa, when windings 30 of stator 14 are energized with electrical current and interact with rotor 16 as it rotates. Many aspects of the stator 14 and rotor 16 described above are conventional and will not be described in further detail.

Shaft 18 extends through rotor 16, and defines a motor axis 36. Motor axis 36 may be a center axis for stator 14, rotor 16, and enclosure 20, all of which are substantially concentrically aligned. Shaft 18 may be fixed to rotor 16 such that as rotor 16 rotates, rotor 16 drives shaft 18. Likewise, when shaft 18 rotates, shaft 18 may drive rotor 16. Bearings 38 support shaft 18 within enclosure 20. Shaft 18 has a front end 40 that extends through and beyond front endshield 22 to enable work output by shaft 18, and a second end 42 that extends through and beyond back endshield 24 to enable coupling with cooling device 10. Shaft end 42 can have a reduced size as compared to shaft body 68 to facilitate coupling with cooling device 10.

In the exemplary embodiment, cooling device 10 includes a fan cover 44, a fan 46, a fan shaft 48, and a speed adjuster 50. Fan cover 44 includes a top 52, a bottom 54, side walls 56 and an end wall 58. Vents 60 are defined in at least one of the side walls 56, end wall 58, top 52, and bottom 54. Fan cover 44 is removably coupled to motor 12 near endshield 24, and more specifically, is coupled by several circumferentially-spaced fasteners 62 that extend through corresponding bores 69 defined on electrical motor 12. When connected to motor 12, fan cover 44 defines an interior 66 sized to house fan 46, fan shaft 48, and speed adjuster 50. Cover end wall 58 is opposite to shaft end 42, such that shaft end 42 is positioned within interior cavity 66.

Fan 46 includes a body 68, an arm 70, and blades 72. Specifically, body 68 includes a bore 74 that receives and couples to fan shaft 48, and arms 70 extend outward from body 68 to enable blades 72 to be spread about body 68. In the exemplary embodiment, arm 70 extends circumferentially from body 68 and about fan shaft 48. More specifically, arm 70 extends from body 68 at an angle that is less than, or approximately equal to 45° as measured with respect to fan body 68. In another embodiment, arm 70 extends from body 68 at an angle of more than about 45°. Arm 70 has an inner surface 76 and an outer surface 78, and fan blades 72 extend outward from outer surface 78 to cause air to move towards electric motor 12.

Speed adjuster 50 couples to shaft end 42, and fan shaft 48, in turn, couples to speed adjuster 50 substantially co-axially along motor axis 36. A longitudinal axis of fan shaft 48 extends substantially along the same axis as motor axis 36. Fan shaft 48 couples to fan 46 to enable fan 46 to be suspended within interior cavity 66 such that fan 46 may rotate within interior cavity 66.

Speed adjuster 50 is sized and oriented to facilitate converting the rotational speed of motor shaft 18 to another rotational speed for fan shaft 48. Speed adjuster 50 varies the rotational speed of fan shaft 48 with respect to the rotational speed of motor shaft 18. Based on the configuration of speed adjuster 50, the rotational speed of fan shaft 48 can be faster, slower, or approximately be the same as the rotational speed of motor shaft 18.

The rotation of fan shaft 48 causes rotation of fan blades 72. In response, fan blades 72 draw ambient air through vents 60 and through fan cover 44. Fan blades 72 are sized and oriented to move the air towards and across motor 12 to facilitate cooling motor 12.

Speed adjuster 50 can be any type of speed or phase adjuster such as, but not limited to, a gearbox assembly or a chain and sprocket assembly. In the exemplary embodiment, speed adjuster 50 includes a planetary gearbox 80. Gearbox 80 includes a housing 82, a sun gear 84, a ring gear 86, a carrier 88 and planetary gears 90.

Figure 4:
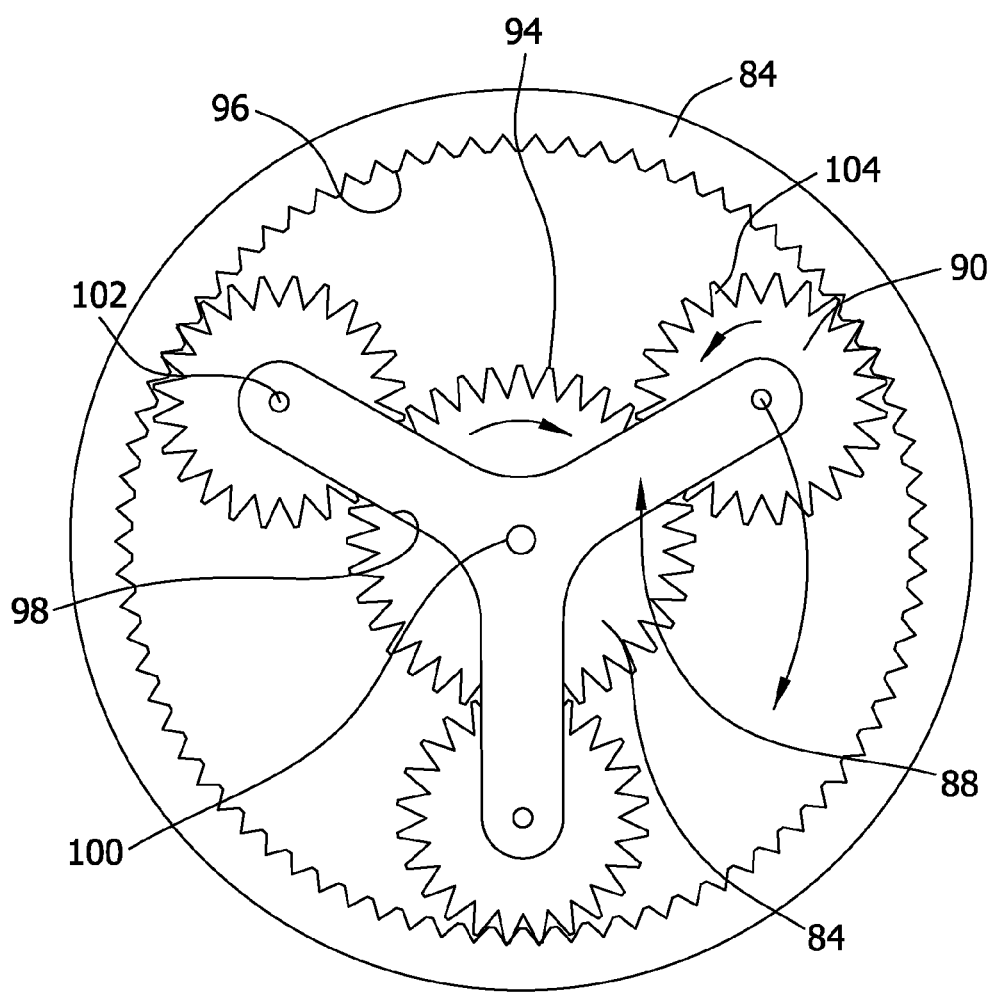
FIG. 4 illustrates a side view of a portion of the cooling device shown in FIG. 2.

FIG. 4 best illustrates sun gear 84, ring gear 86, carrier 88, and planet gears 90. Shaft end 42 extends into gearbox housing 82 and bearings 38 rotatably support motor shaft 18. Sun gear 84 is coupled to shaft end 42 and a bore 92 defined in sun gear 84 enables gear 84 to be press fit on to shaft end 42. Alternatively, sun gear 84 can be machined or formed integrally with shaft end 42. Sun gear 84 can be formed in any configuration that enables gear 84 to be coupled to shaft end 42. In the exemplary embodiment, sun gear 84 includes an array of external gear teeth 94 that extend radially outward from shaft end 42. Ring gear 86 is substantially fixed, relative to the interior of housing 82, and extends circumferentially about sun gear 84. Ring gear 86 has an array of internal gear teeth 96 that extend towards sun gear 84.

Carrier 88 is coupled to fan shaft 48. In the exemplary embodiment, carrier 88 is a planar disk 98 that is generally triangular shaped and includes a central circular bore 100 that is sized to receive fan shaft 48 therein, and substantially circular bores 101 defined near outer perimeter of disk 98 for receiving planet gears 90 via pinions 102. In the exemplary embodiment, three pinions 102 are spaced substantially equally about carrier 88. Alternatively, any number of pinions 102 and planet gears 90 that enables operation of gearbox 80 as described herein may be used. Moreover, planet carrier 88 need not be generally triangular-shaped, but may be any shape that enables expansion of central bore 100 for shrink-fitting purposes. More specifically, any carrier 88 configuration that enables fan shaft 48 to be coupled to carrier 88, and that is sized to receive planet gears 90 therein, may be used.

Planet gears 90 mount on respective pinions 102 to enable planet gears 90 to couple to carrier 88. Planet gears 90 include an array of internal gear teeth 104 that extend towards sun gear 84. As such, planet gears 90 mesh with sun gear 84 and ring gear 86.

During operation of motor 12, sun gear 84 receives rotational forces from shaft end 42 and rotates planet gears 90 relative to housing 82 in response to rotation of shaft end 42. When sun gear 84 rotates, the rotational force of shaft end 42 is induced to planet gears 90 to cause planet gears 90 to orbit around sun gear 84 and within ring gear 86 to rotate carrier 88.

Fan shaft 48 and fan 46 rotate in response to rotation of carrier 88. Based on the configurations and gear ratios of components within gearbox 80, fan shaft 48 can rotate at a different speed than the rotational speed of shaft end 42. In the exemplary embodiment, gearbox 80 rotates fan shaft 48 and fan 46 at a faster rotational speed than the rotational speed of shaft end 42. Rotation of fan shaft 48 enables fan 46 to draw air into fan cover 44 via vents 60. More specifically, air is drawn towards and across motor 12 to facilitate cooling of motor 12. Gearbox 80 can also rotate fan shaft 48 at a slower or approximately the same speed as shaft end 42.

Figure 5:
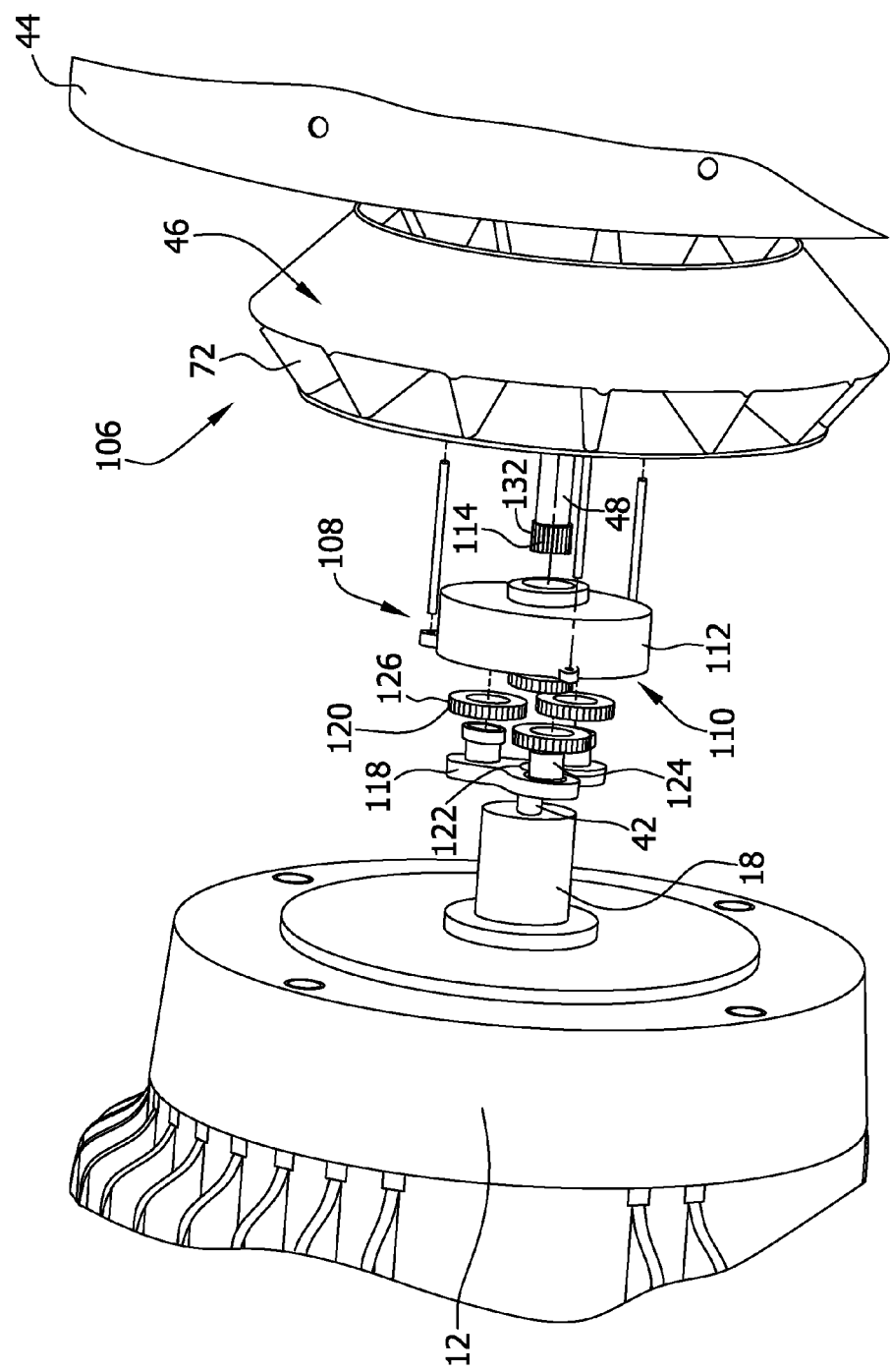
FIG. 5 illustrates a side exploded view of an alternative cooling device that may be used for cooling a motor.
Figure 6:
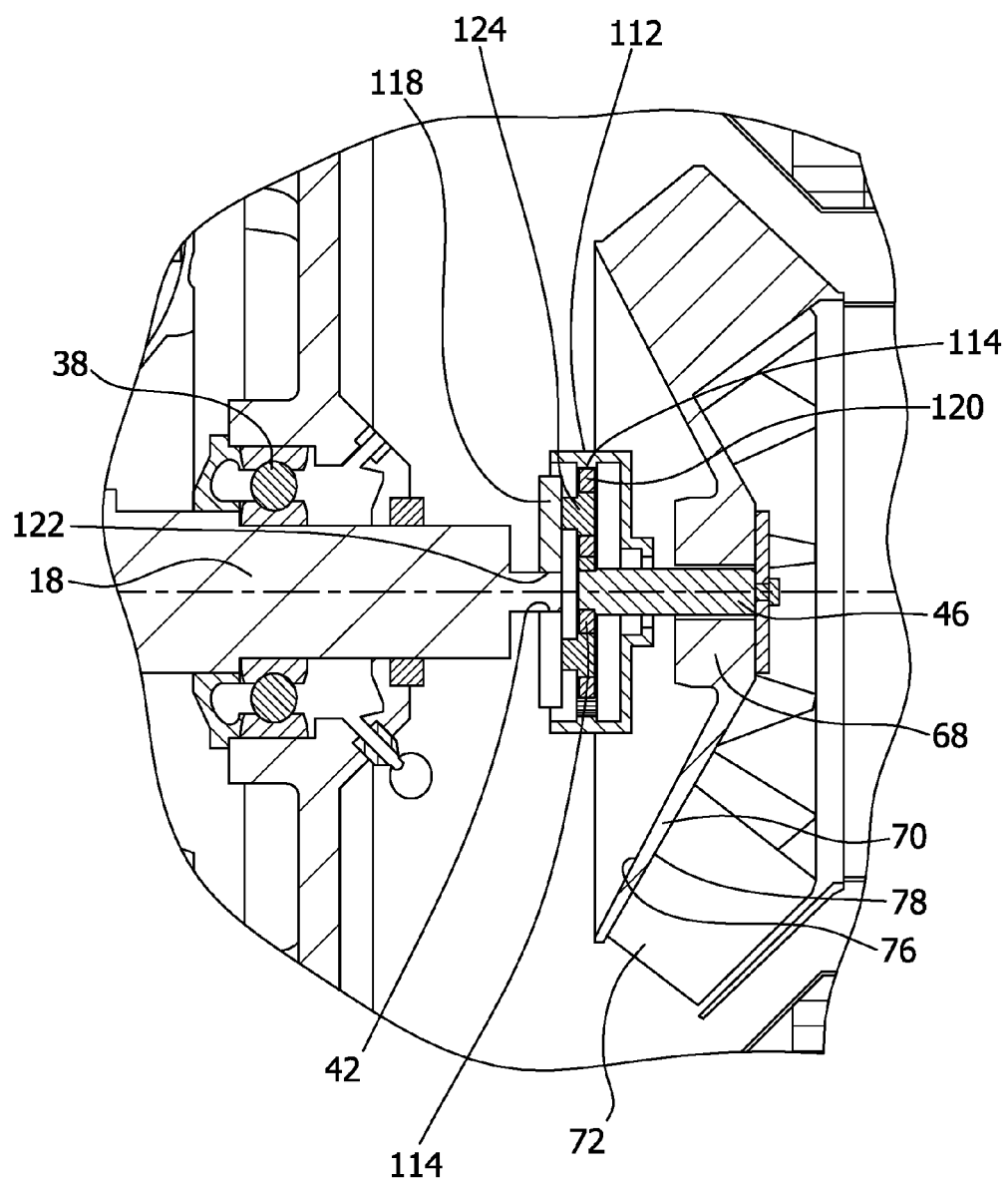
FIG. 6 illustrates a partial detail view of an exemplary speed adjuster used with the cooling device shown in FIG. 5.

FIG. 5 illustrates a side exploded view of another exemplary cooling device 106 used for cooling motor 12. FIG. 6 illustrates a partial detail view of exemplary components of cooling device 106. Cooling device 106 includes a speed adjuster 108. In the exemplary embodiment, speed adjuster 108 includes planetary gearbox 110. Planetary gearbox 110 includes a housing 112, a sun gear 114, a ring gear 116, a carrier 118, and planet gears 120.

A central bore 122 of the planet carrier 118 is coupled to shaft end 42, in a suitable manner, for rotation of planet carrier 118 with shaft end 42. Bore 122 of carrier 118 can be press fit to shaft end 42. Alternatively, carrier 118 can be machined or formed from shaft end 42. More specifically, any configuration of carrier 118 that enables coupling to shaft end 42 herein may be used.

Planet carrier 118 supports a plurality of planet pinions 124 therein to enable orbital movement about motor axis 36. In the exemplary embodiment, three planet pinions 124 are provided, spaced apart equally about carrier 118. The number of planet gears 120 is equal to the number of planet pinions 124. Any number of pinions 124 and planet gears 120 to enable operation of the gearbox 110 may be used herein. Each of the planet gears 120 is fixed to one of the planet pinions 124 to rotate with its associated planet pinion 124. Planet gears 120 have an array of external gear teeth 126.

Ring gear 116 is substantially fixed relative to the interior of gearbox housing 112. Ring gear 116 includes an array of internal gear teeth 128. Internal gear teeth 128 on ring gear 116 are in meshing engagement with external gear teeth 126 on planet gears 120.

Sun gear 114 mounts within planet carrier 118, surrounded by planet gears 120. Sun gear 114 is radially supported by contact with surrounding planet gears 120, for rotation of sun gear 114 relative to gearbox housing 112 about motor axis 36. Sun gear 114 is coupled with fan shaft 48. A bore 130 defined in sun gear 114 engages gear 114 to be press fit to fan shaft 48. Alternatively, sun gear 114 can be machined or formed integrally with shaft end 48. Sun gear 114 can be formed in any configuration that enables gear 114 to be coupled to fan shaft 48. Sun gear 114 has an array of external gear teeth 132 that extend radially outward from fan shaft 46. External gear teeth 132 of sun gear 114 are in meshing engagement with external gear teeth 126 on planet gears 120.

During operation of motor 12, carrier 118 receives rotational force from shaft end 42 and rotates carrier 118 relative to gearbox housing 112 in response to that rotational force. When planet carrier 118 rotates, rotational force of shaft end 42 is induced to planet gears 120 to drive planet gears 120 to rotate about pinions 124. Rotation of planet gears 120, in response to rotation of shaft end 42 and carrier 118, enables sun gear 114 to rotate about motor axis 36. The rotational force of shaft end 42 and planet carrier 118 is transmitted through planet gears 120 to sun gear 114, driving sun gear 114 for rotation about motor axis 36.

Fan shaft 48 and fan 46 rotate in response to the rotation of sun gear 114. Based on the configurations and gear ratios of components within gearbox 110, fan shaft 48 rotates at a different speed than the speed of shaft end 42. In the exemplary embodiment, gearbox 110 rotates fan shaft 48 and fan 46 at a faster speed than the speed of shaft end 42. Rotation of fan shaft 48 enables fan 46 to draw air into fan cover 44 via vents 60. More specifically, air is drawn towards and across motor 12 to facilitate cooling of motor 12. Gearbox 110 can also rotate fan shaft 48 at a slower or approximately the same speed as shaft end 42.

FIG. 7 is a flowchart of an exemplary method that may be used to manufacture a cooling device, such as cooling device 10. In the exemplary embodiment, any or all of the manufacturing processes can be performed on a new assembly of an electrical motor 12 or to modify an existing electrical motor 12.

In the exemplary embodiment, initially, sun gear 86 is coupled 710 to shaft end 42. Planet gear 90 is then coupled 720 to carrier 88 via pinion 102. R ring gear 86 is coupled relative 730 to the interior of housing 82 and about sun gear 84. Carrier 88 is then meshed 740 to planet gear 90 and to ring gear 86. Carrier 88 is then coupled 750 to fan shaft 48. In the exemplary embodiment, fan 46 is rotatably suspended from the housing 82. Fan cover 49 is coupled to electric motor 12 to enable speed adjuster 50 and fan 46 to be positioned within interior cavity 66.

The embodiments described herein provide a shaft-powered, geared fan that facilitates enhanced motor cooling and heat dissipation by using the motor shaft as the prime mover. Being of modular construction, the speed adjuster enables a manufacturer to choose fan characteristics, such as speed, irrespective of motor speed. Moreover, by using a fan with predefined operating characteristics, the fan can be selected based at least on motor resistance so as to operate the fan at its best efficiency performance and with minimum noise. With better cooling and heat dissipation more power can be supplied to the motor. Thus, horsepower can be increased with less electrical and mechanical frictional losses. Fan performance depends on its own operating characteristics. Therefore, the fan is designed for best performance in terms of efficiency, CFM and noise and using the fan with different motor polarities enhances the motor performance. Since the fan can be designed on its own operating characteristics, the cooling device described herein eliminates different combinations of fan cover types, fan types and associated mounting arrangements. Additionally, the cooling device reduces the overall footprint of the fan and fan cover to occupy less space and to provide more aesthetic appearances.

In an embodiment of the present invention, increasing the speed of fan can use all types of gear trains, sprocket and chain mechanisms, belt and pulley mechanisms etc. The exemplary method of increasing the speed of the fan is by mounting the fan on planetary gear train, which gives maximum ratio in a very compact space while providing high operating efficiencies. Planetary gearboxes provide further advantages such as, but not limited to: low backlash, compact size, less weight, high cyclic and radial load carrying capacity, improved efficiency, shock resistance and lubrication benefits.

The components of the speed adjuster modularly assemble to facilitate convenient removability and replacement of components to provide the assembler different fan criteria for cooling the electric motor. Additionally, the interchangeability of components allows different gearing ratios and calculations to design different rotational speeds for the fan shaft to accommodate different criteria of the electric motor and the fan. Further, gearboxes are standard which reduces the cost of adding the cooling device.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An operating device for use with a motor having a motor shaft, said device comprising:
   a fan shaft;
   a fan coupled to said fan shaft; and
   a speed adjuster coupled to the motor shaft and coupled to said fan shaft, said speed adjuster adjusts a rotational speed of said fan shaft to cause said fan shaft to rotate at a different rotational speed than the motor shaft to facilitate passing cooling air past the motor to facilitate enhanced cooling of the motor.

2. The device of claim 1, wherein said speed adjuster comprises a planetary gearbox.

3. The device of claim 2, wherein said planetary gearbox comprises a housing and a ring gear.

4. The device of claim 3, wherein said planetary gearbox comprises a sun gear coupled to a shaft end of the motor shaft.

5. The device of claim 4, wherein said planetary gearbox comprises a plurality of planet gears operatively coupled between said ring gear and said sun gear.

6. The device of claim 5, wherein said planetary gearbox comprises a carrier rotatably carrying said plurality of planet gears and coupled to said fan shaft.

7. The device of claim 2, wherein said planetary gearbox comprises a sun gear coupled to said fan shaft.

8. The device of claim 7, wherein said planetary gearbox comprises a plurality of planet gears operatively coupled between said ring gear and said sun gear.

9. The device of claim 8, wherein said planetary gearbox comprises a carrier rotatably coupled to said plurality of planet gears and coupled to a shaft end of the motor shaft.

10. An electrical motor, comprising:
a stator having a longitudinal axis;
a rotor rotatably coupled within said stator;
a motor shaft rotatably coupled to said rotor along said longitudinal axis;
a fan shaft;
a fan mounted to said fan shaft; and
a speed adjuster coupled to a motor shaft of said motor and coupled to said fan shaft, said speed adjuster adjusts a rotational speed of said fan shaft to cause said fan shaft to rotate at a different rotational speed than said motor shaft to facilitate passing cooling air past the motor to facilitate enhanced cooling of said motor.

11. The electrical motor of claim 10, wherein said speed adjuster comprises a planetary gearbox.

12. The electrical motor of claim 11, wherein said planetary gearbox comprises:
a housing;
a ring gear disposed within said housing;
a sun gear coupled to a shaft end of said motor shaft;
a plurality of planet gears operatively coupled with said ring gear and said sun gear; and
a carrier rotatably carrying said plurality of planet gears and coupled to said fan.

13. The electrical motor of claim 11, wherein said planetary gearbox comprises:
a housing;
a ring gear disposed within said housing;
a sun gear coupled to said fan;
a plurality of planet gears operatively coupled with said ring gear and said sun gear; and
a carrier rotatably carrying said plurality of planet gears and coupled to a shaft end of said motor shaft.

14. The electrical motor of claim 10, further comprising a fan cover configured to house said speed adjuster and said fan.

15. A method of assembling a motor, the method comprising:
coupling a fan to a fan shaft; and
coupling a speed adjuster to the fan shaft and to a motor shaft of the motor, the speed adjuster adjusts a rotational speed of the fan shaft to cause the fan shaft to rotate at a different rotational speed than the motor shaft to facilitate passing cooling air past the motor.

16. The method of claim 15, wherein coupling the speed adjuster comprises coupling a planetary gearbox to the fan shaft and to the motor shaft.

17. The method of claim 16, wherein coupling the planetary gearbox comprises coupling a sun gear of the planetary gearbox to the motor shaft.

18. The method of claim 17, wherein coupling the planetary gearbox comprises coupling a carrier of the planetary gearbox to the fan shaft.

19. The method of claim 16, wherein coupling the planetary gearbox comprises coupling a sun gear of the planetary gearbox to the fan shaft.

20. The method of claim 19, wherein coupling the planetary gearbox comprises coupling a carrier of the planetary gearbox to the motor shaft.

* * * * *